United States Patent
Itoyama et al.

(10) Patent No.: US 6,253,127 B1
(45) Date of Patent: Jun. 26, 2001

(54) ENGINE STARTUP CONTROL DEVICE AND CONTROL METHOD

(75) Inventors: Hiroyuki Itoyama, Yokohama; Yasuhiko Kitajima, Kamakura; Yoshitaka Deguchi, Yokohama, all of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/412,333

(22) Filed: Oct. 5, 1999

(30) Foreign Application Priority Data

Oct. 15, 1998 (JP) .................................................. 10-293674

(51) Int. Cl.$^7$ ..................................................... G06F 17/00
(52) U.S. Cl. ........................... 701/22; 123/179.1; 701/113
(58) Field of Search .................................. 701/1, 22, 36, 701/99, 102, 110, 113; 123/339.1, 339.14, 339.19, 179.1, 179.12, 179.5

(56) References Cited

U.S. PATENT DOCUMENTS

| | | | | |
|---|---|---|---|---|
| 4,009,695 | * | 3/1977 | Ule ..................................... | 123/179.5 |
| 4,192,279 | * | 3/1980 | Maisch et al. ..................... | 123/179.1 |

OTHER PUBLICATIONS

Tetsudo Nihon Sha, "Automotive Engineering", vol. 46, No. 7, pp. 39–52, (Jun., 1997).

* cited by examiner

Primary Examiner—William A. Cuchlinski, Jr.
Assistant Examiner—Edward Pipala
(74) Attorney, Agent, or Firm—Foley & Lardner (57) ABSTRACT

A hybrid vehicle is provided with an engine (2), a first motor (1) for starting the engine (2), a generator (1) for driving the engine (2), drive wheels (8) connected to the engine (2) via a clutch (3), and a second motor (4) for driving the drive wheels (8). A battery (15) connected to the first motor (1), second motor (4) and generator (1) is further provided. A control device which controls the engine startup by the first motor (1) comprises a sensor (27) which detects a rotation speed of the engine (2), a sensor (26) which detects the charge amount of the battery (15), a power controller (11) which varies the current supplied to the first motor (1) from the battery (15) according to a signal, and a microprocessor (16) which outputs the signal. The microprocessor (16) calculates a target output torque of the first motor (1) according to the charge amount of the battery (15). When the rotation speed of the engine (2) is less than a predetermined target rotation speed, the signal is set so that the output torque of the first motor (1) coincides with a predetermined output torque, and after the rotation speed of the engine (2) reaches the predetermined target rotation speed, the signal is set so that the rotation speed of the engine (2) is maintained at the predetermined target rotation speed.

9 Claims, 6 Drawing Sheets

ENGINE STARTUP CONTROL DEVICE AND CONTROL METHOD

FIELD OF THE INVENTION

This invention relates to output control of a motor for starting a vehicle engine.

BACKGROUND OF THE INVENTION

A parallel hybrid vehicle comprising a motor and an engine as sources of drive force, which runs under the drive force of either or both of the motor and engine, is disclosed on pp. 39–52 of "Automotive Engineering" Vol.46 No.7 June, 1997 published by the Tetsudo Nihon Sha.

This vehicle runs only under the drive force of the motor when the vehicle load is small, and the engine is operated to increase the drive force when the vehicle load exceeds a predetermined level.

SUMMARY OF THE INVENTION

In such a parallel hybrid vehicle, when a shift is performed from running on the motor alone to running on the engine together with the motor, the engine is started by a starter motor.

This starter motor operates also as a power generator after the engine starts its operation.

When the starter motor cranks up the engine, it is preferable to supply a large amount of power to the starter motor so as to ensure the start of the engine. However, this may make the battery go into an over discharge, which is a discharge beyond the power limit determined by the state of charge of the battery. Such an over discharge causes deterioration of the battery. In particular, when the battery temperature is low, the power which can be supplied by the battery is small, and an over discharge tends to occur easily. Moreover, at low temperature, the period during which the battery can supply power is also short.

On the other hand, after the cranking of the engine, the rotation speed of the engine must be quickly controlled to a target rotation speed so as to match the running state of the vehicle or the required power generation amount of the vehicle.

A delay in this control may cause the increase of battery power consumption as well as adversely affect the drivability of the vehicle.

It is therefore an object of this invention to properly control the output of the motor during startup of the engine.

In order to achieve the above object, this invention provides an engine startup control device for use with a hybrid vehicle. The vehicle comprises an engine, a first motor for starting the engine, a generator for driving the engine, a drive wheel connected to the engine via a clutch, a second motor for driving the drive wheel and a battery which can be connected to the first motor, the second motor and the generator. The control device comprises a sensor which detects a rotation speed of the engine, a sensor which detects a charge amount of the battery, a power controller which varies a current supplied to the first motor according to a signal, and a microprocessor programmed to calculate a target output torque of the first motor according to the charge amount of the battery, set the signal so that an output torque of the first motor coincides with a predetermined target output torque when the rotation speed of the engine is less than a predetermined target rotation speed, and set the signal so that the rotation speed of the engine is maintained at the target rotation speed after the rotation speed has reached the target rotation speed.

This invention also provides an engine startup control method for a hybrid vehicle. The vehicle comprises an engine, a first motor for starting the engine, a generator for driving the engine, a drive wheel connected to the engine via a clutch, a second motor for driving the drive wheel, a battery which can be connected to the first motor, the second motor and the generator, and a power controller which varies a current supplied to the first motor according to a signal. The control method comprises detecting a rotation speed of the engine, detecting a charge amount of the battery, calculating a target output torque of the first motor according to the charge amount of the battery, setting the signal so that an output torque of the first motor coincides with a predetermined target output torque when the rotation speed of the engine is less than a predetermined target rotation speed, and setting the signal so that the rotation speed of the engine is maintained at the target rotation speed after the rotation speed has reached the target rotation speed.

The details as well as other features and advantages of this invention are set forth in the remainder of the specification and are shown in the accompanying drawings.

DESCRIPTION OF THE PREFERRED EMBODIMENTS

Figure 1:
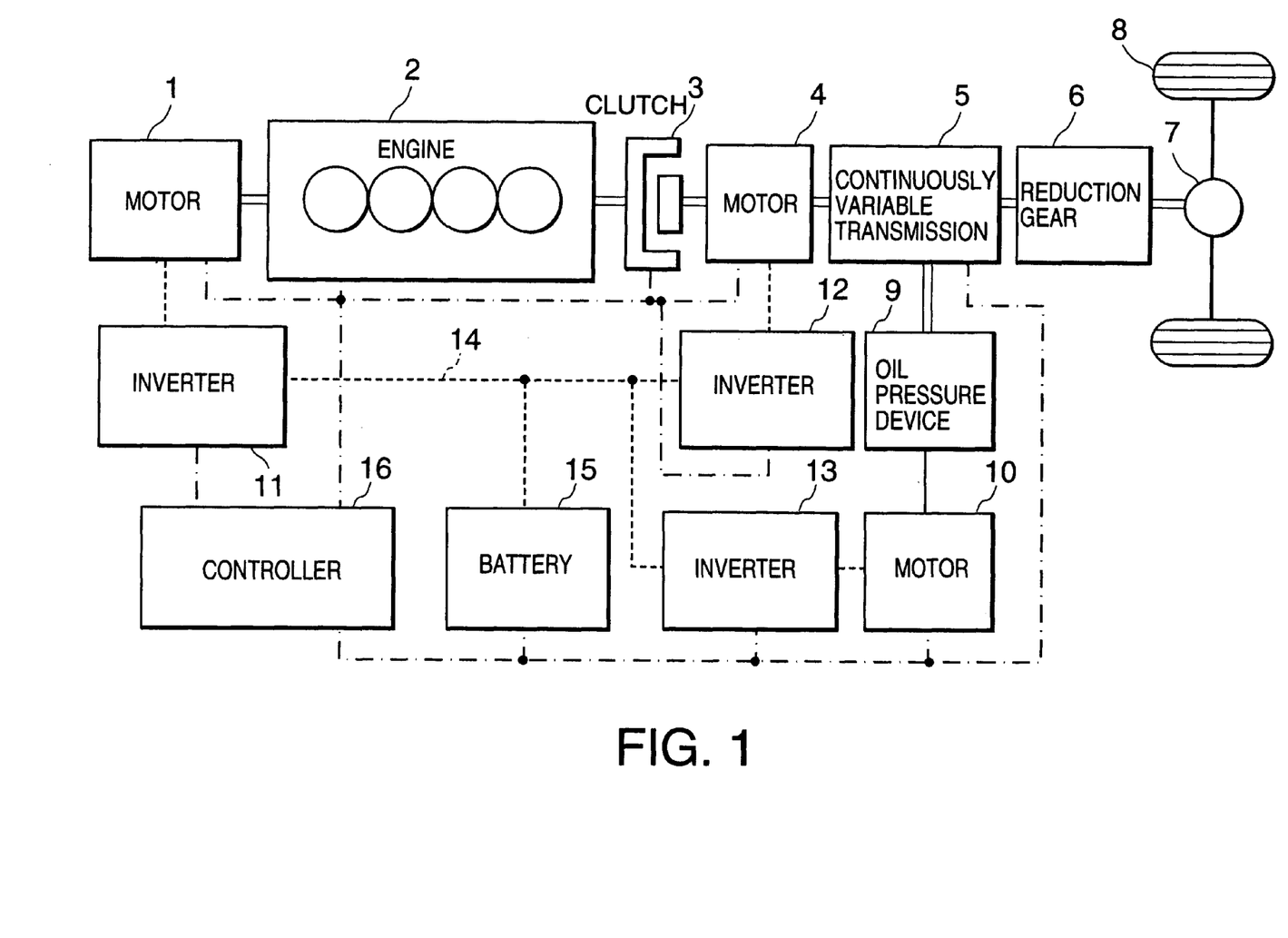
FIG. 1 is a schematic diagram of a hybrid vehicle to which this invention is applied.

Referring to FIG. 1 of the drawings, a parallel hybrid vehicle to which this invention is applied comprises an engine 2 connected to a motor 4 through a clutch 3.

The output of the motor 4 is supplied to drive wheels 8 via a continuously variable transmission 5, reduction gear 6 and differential gear 7. When the clutch 3 is engaged, the drive force of both the engine 2 and the motor 4 is transmitted to the drive wheels 8.

The clutch 3 is a powder clutch wherein the transmitted torque can be adjusted. The continuously variable transmission 5 is a V-belt continuously variable transmission which transfers drive force at an arbitrary speed ratio via a V-belt looped around a pair of pulleys. The speed ratio of the continuously variable transmission 5 varies according to an oil pressure supplied from an oil pressure system 9.

Other motors 1, 10 are respectively connected to the engine 2.

The motor 1 is mainly used for starting the engine 2, and for generating power. The motor 4 drives the drive wheels 8, and performs regenerative power generation during the braking of the vehicle. Therefore, both of the motors 1 and 4 have a function of a motor/generator.

On the other hand, the motor 10 is used to drive an oil pump provided to the oil pressure system 9, and it functions only as a motor.

The motors 1, 4 and 10 are alternating current motors, and the operation of the motors 1, 4 and 10 are controlled by inverters 11, 12 and 13. Direct current motors may also be used for the motors 1, 4 and 10. In this case, the inverters are replaced by direct current/direct current converters.

The solid line in FIG. 1 shows a mechanical force transmission path, the broken line shows a power transmission path, the dotted line shows a signal transmission path, and the double line shows an oil pressure transmission path.

The inverters 11, 12 and 13 are connected to a direct current link 14. The direct current link 14 is connected to a battery 15. The inverters 11, 12 and 13 convert the direct current of the battery 15 into an alternating current, and supply it to the motors 1, 4 and 10. The alternating current generated by the motors 1 and 4 is converted into direct current by the inverters 11 and 12, and used to charge the battery 15.

Since the motors 1, 4, 10 are directly connected with each other via the direct current link 14, the current generated by any motor can be used as drive current for another motor via the direct current link 14 without storing it in the battery 15.

Various batteries, such as a lithium ion battery, nickel hydrogen battery or lead battery, or an electric double-layer capacitor or so-called power capacitor, can be used as the battery 15.

Engaging and disengaging of the clutch 3, and the torque transmitted by the clutch 3, are controlled by output signals from a controller 16.

The rotation speeds and output torques of the motors 1, 4 and 10, the speed ratio of the continuously variable transmission 5, the fuel injection amount of the engine 2, and the fuel injection timing and ignition timing, are also controlled by output signals from the controller 16.

The controller 16 comprises a microcomputer provided with a central processing unit, read-only memory (ROM), random access memory (RAM) and input/output interface (I/O interface).

Figure 2:
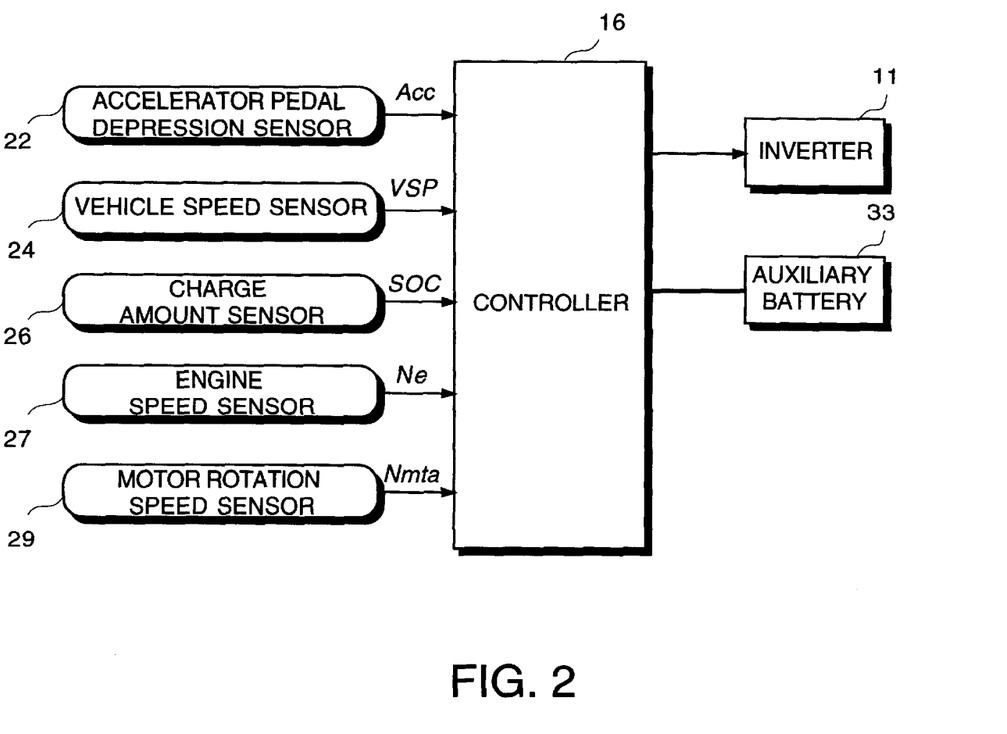
FIG. 2 is a schematic diagram of an engine startup controller according to this invention.

Next, referring to FIG. 2, an accelerator pedal depression sensor 22, vehicle speed sensor 24, charge amount sensor 26, engine rotation speed sensor 27 and motor rotation speed sensor 29 are connected to the controller 16.

The accelerator pedal depression sensor 22 detects a depression degree Acc of the accelerator pedal of the vehicle and outputs a corresponding signal.

The vehicle speed sensor 24 detects a running speed of the vehicle VSP and outputs a corresponding signal.

The charge amount sensor 26 detects a State Of Charge (referred to hereafter as SOC for convenience) which is a representative value of the charge amount of the battery 15.

The engine speed sensor 27 detects a rotation speed Ne of the engine 2 and outputs a corresponding signal.

The motor rotation speed sensor 29 detects the rotation speed Nmta of the motor 4 and outputs a corresponding signal.

The controller 16 controls the rotation speed of the motor 1 based on the above signals. This is done by outputting a control signal to the inverter 11.

The control of the other inverters 12 and 13, the engine 2, the clutch 3 and the continuously variable transmission 5 is similarly performed by the controller 16, but FIG. 2 shows only elements relevant to control of the inverter 11.

The controller 16 is operated by power supplied from a low voltage auxiliary battery 33.

Next, referring to FIG. 3, a control routine performed by the controller 16 to control the motor 1 will be described. This routine is performed as part of the total control of the hybrid vehicle performed by the controller 16, and is performed at an interval of, for example, 10 milliseconds.

In a step S301, parameters are acquired for determining whether or not a startup condition of the engine 2 holds.

The predetermined start condition is that startup of the engine 2 is requested when the vehicle is running only under the power of the motor 4.

This condition corresponds to either of the following cases where power has to be generated by the motor 1, or where the required drive force of the vehicle exceeds the drive force of the motor 4.

In the following description, for convenience, the former will be referred to as a first condition and the latter will be referred to as a second condition. The parameters for determining this are an operating state of the clutch 3, SOC of the battery 15, vehicle speed VSP, accelerator depression degree Acc and engine rotation speed Ne.

Herein, the operating state of the clutch 3 denotes whether the clutch is ON or OFF.

Since the controller 16 also performs control of the clutch 3, this can be found from the control signal output to the clutch 3 by the controller 16.

The SOC of the battery 15 is calculated from the output signal of the charge amount sensor 26, the vehicle speed VSP is obtained from the output signal of the vehicle speed sensor 24, the accelerator depression degree Acc is obtained from the output signal of the accelerator pedal depression sensor 22, and the engine speed Ne is obtained from the output signal of the engine rotation speed sensor 27, respectively.

In a step S302, it is determined whether or not the above-mentioned engine startup condition holds based on the read parameters.

This determining is performed as follows.

First, as an engine startup condition, it is required that the engine 2 is not running. Running here implies that the engine 2 is performing complete combustion. If a predetermined time has elapsed after the engine rotation speed reaches a target rotation speed Netrg described later, it is determined that the engine 2 is running.

Moreover, when the engine 2 is started, the clutch 3 must be released.

Further, there must also be a startup request to the engine 2.

When either of the following two conditions is satisfied, it is determined that a start request exists. First, it is determined that the first condition holds when the SOC of the battery 15 is less than a predetermined amount. This is the case where startup of the engine 2 is necessary to charge the battery 15.

Next, it is determined that the second condition holds when the required vehicle drive force exceeds the drive force which the motor 4 can supply. This case is the case where the output of the engine 2 is needed for driving the vehicle. The determining of the second condition is performed as follows.

First, the drive force which the motor 4 can supply is calculated from the SOC of the battery 15 and the vehicle speed VSP. The drive force of the vehicle which is required, on the other hand, is calculated from the accelerator depression degree Acc and the vehicle speed VSP.

These determinations are known in the art, and may be performed by looking up a map prestored in the controller 16 instead of by pure calculation.

When the two values obtained in this way are compared, if the required vehicle drive force exceeds the drive force which the motor 4 can supply, it is determined that the second condition holds.

When the engine 2 is performing complete combustion and the clutch 3 is engaged, if either of the aforesaid first and second start conditions does not hold, it is determined in the step S302 that the startup condition is not satisfied. In this case, the routine terminates without proceeding to other steps.

On the other hand, when the clutch 3 is released, the engine 2 is not in the complete combustion state, and either the first or second condition holds, it is determined that the startup condition holds.

In this case, the routine proceeds to a step S304.

Here, it is determined whether or not startup of the engine 2 is necessary for power generation of the motor 1. The case when the first start condition holds and the second start condition does not hold corresponds to this criterion. The determining of the step S304, therefore, is performed using the determining results of the first and second startup conditions performed in the step S302.

When startup of the engine 2 is required only for power generation of the motor 1, the routine proceeds to a step S305.

Here, the required power generation amount is calculated based on the SOC of the battery 15. In a following step S306, the target rotation speed Netrg of the engine 2 is calculated from the required power generation amount.

Figure 5:
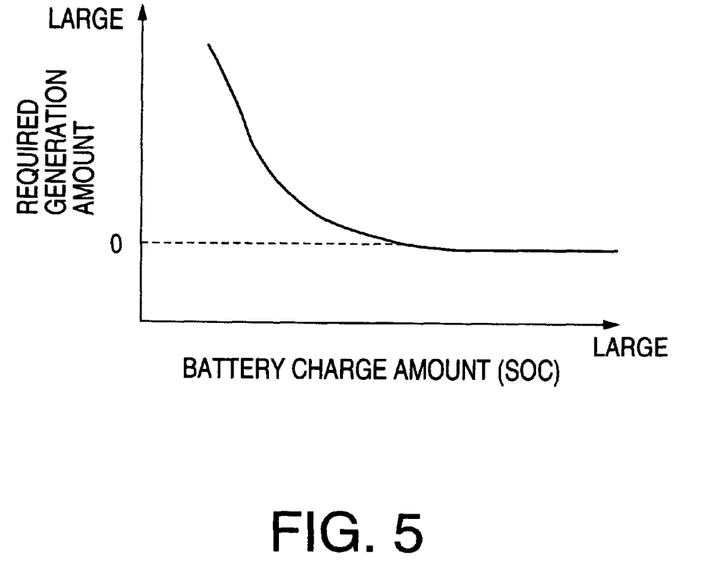
FIG. 5 is a diagram showing the contents of a table specifying a relation between the battery charge state (SOC) and a required power generation amount stored by the engine startup controller.

The relation of the required power generation amount and SOC is shown in FIG. 5. Therefore, to determine the required power generation amount, it is sufficient to prestore a map or table of these contents in the controller 16, and to look up this map or table in the step S305 based on SOC.

Figure 6:
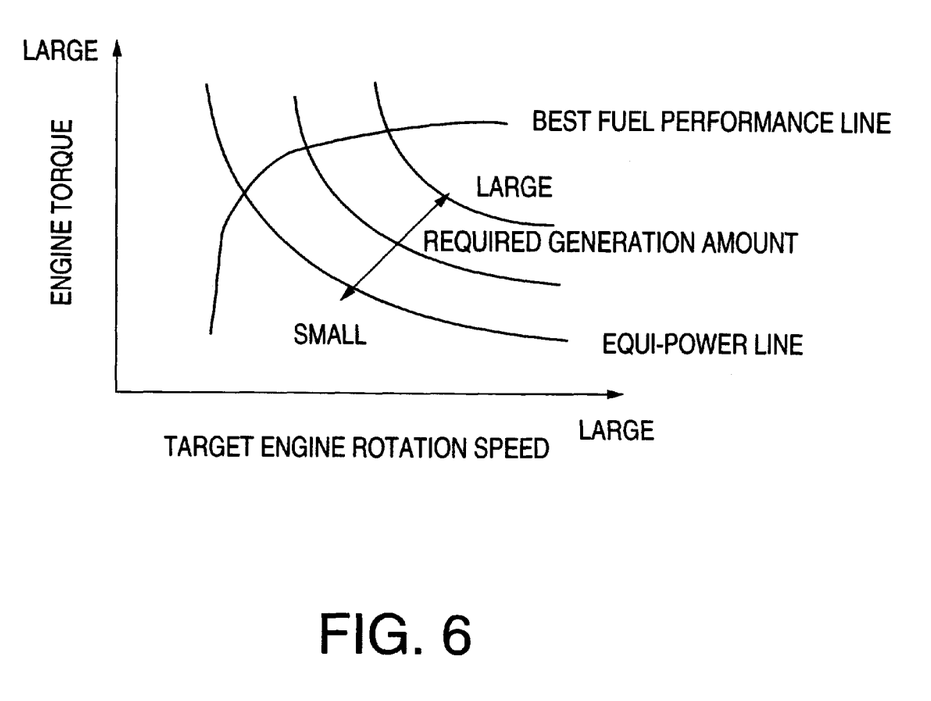
FIG. 6 is a diagram showing the contents of a table for calculating a target engine rotation speed from the required power generation amount stored by the engine startup controller.

In the step S306, the target rotation speed Netrg is calculated referring to the map shown in FIG. 6.

This represents, in the form of curves, a relation between engine torque and rotation speed for plural engine output powers, each curve representing one power. The combination of torque and engine rotation speed for realizing the engine power with the minimum fuel consumption is plotted on the curve for each engine power, and the line connecting these points is the best fuel cost-performance.

Here, the required power generation amount uniquely corresponds to an engine power. Therefore, the target rotation speed Netrg which satisfies the required power generation amount is obtained at the intersection of the engine power and best fuel cost-performance line corresponding to the required power generation amount.

In the step S306, the above processing is performed and the target rotation speed Netrg is determined.

The processing of the steps S305 and S306 may also be performed by calculation without using maps and tables. In this case, the target rotation speed Netrg can be calculated directly from the SOC without separating the steps S305 and S306.

On the other hand, when the second startup condition holds in the step S304, the routine proceeds to a step S307.

When the second startup condition holds, the clutch 3 is engaged after complete combustion of the engine 2, and the output torque of the engine 2 is used for driving the vehicle.

When the clutch 3 is engaged, the target rotation Netrg of the engine 2 is made to coincide with the rotation speed Nmta of the motor 4 detected by the motor rotation speed sensor 29 in the step S307 so that a shock does not occur due to the rotation difference of the engine 2 and the motor 4 during the engaging of this clutch 3.

The setting of the target rotation speed Netrg of the engine 2 according startup conditions in this way assumes that the throttle opening degree of the engine 2, fuel injection amount, ignition timing, etc. are determined based on this target rotation speed Netrg, and that the engine rotation speed after complete combustion is controlled the to target rotation speed Netrg. This implies that in the processing of these steps, the target rotation speed of the engine after complete combustion is achieved during startup control.

After setting the target rotation speed Netrg of the engine 2 in the steps S305 or S307, the routine proceeds to a step S308. In the step S308, the real rotation speed Ne of the engine 2 detected by the engine rotation speed sensor 27 is compared with the engine rotation speed Netrg.

If Ne<Netrg, the routine proceeds to a step S309.

If Ne≧Netrg, the routine proceeds to a step S311.

In the step S309, in torque control, a power KWOUTS which the battery 15 can supply is calculated from the charge state SOC of the battery 15. The power KWOUTS is divided by the real rotation speed Ne of the engine 2 and multiplied by a conversion coefficient K# to compute a control torque Trq.

In a following step S310, after controlling the inverter 11 so that the output torque of the motor 1 coincides with this control torque Trq, the routine is terminated.

On the other hand, in the step S311, the rotation speed of the motor 1 is controlled via the inverter 11 so that the real rotation speed Ne of the engine 2 coincides with the target rotation speed Netrg.

The rotation speed of the motor 1 is directly proportional to the real rotation speed of the engine 2.

Figure 4A:
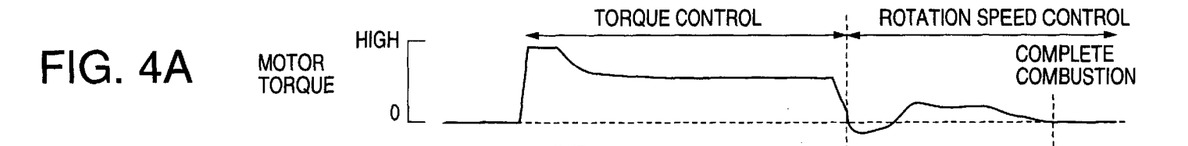
FIGS. 4A–4E are timing charts showing a variation of motor torque, engine rotation speed, battery voltage and battery charge state (SOC) under the control of the engine startup controller.

By performing the above routine, when the motor 1 starts the engine 2, the controller 16 first controls the torque of the motor 1 based on the charge state SOC of the battery 15 until the real rotation speed Ne of the engine 2 reaches the target rotation speed Netrg as shown in FIG. 4A. After the real rotation speed No of the engine 2 reaches the target rotation speed Netrg, the rotation speed of the motor 1 Is controlled so that the real rotation speed Ne of the engine 2 coincides with the target rotation speed Netrg.

Figure 3:
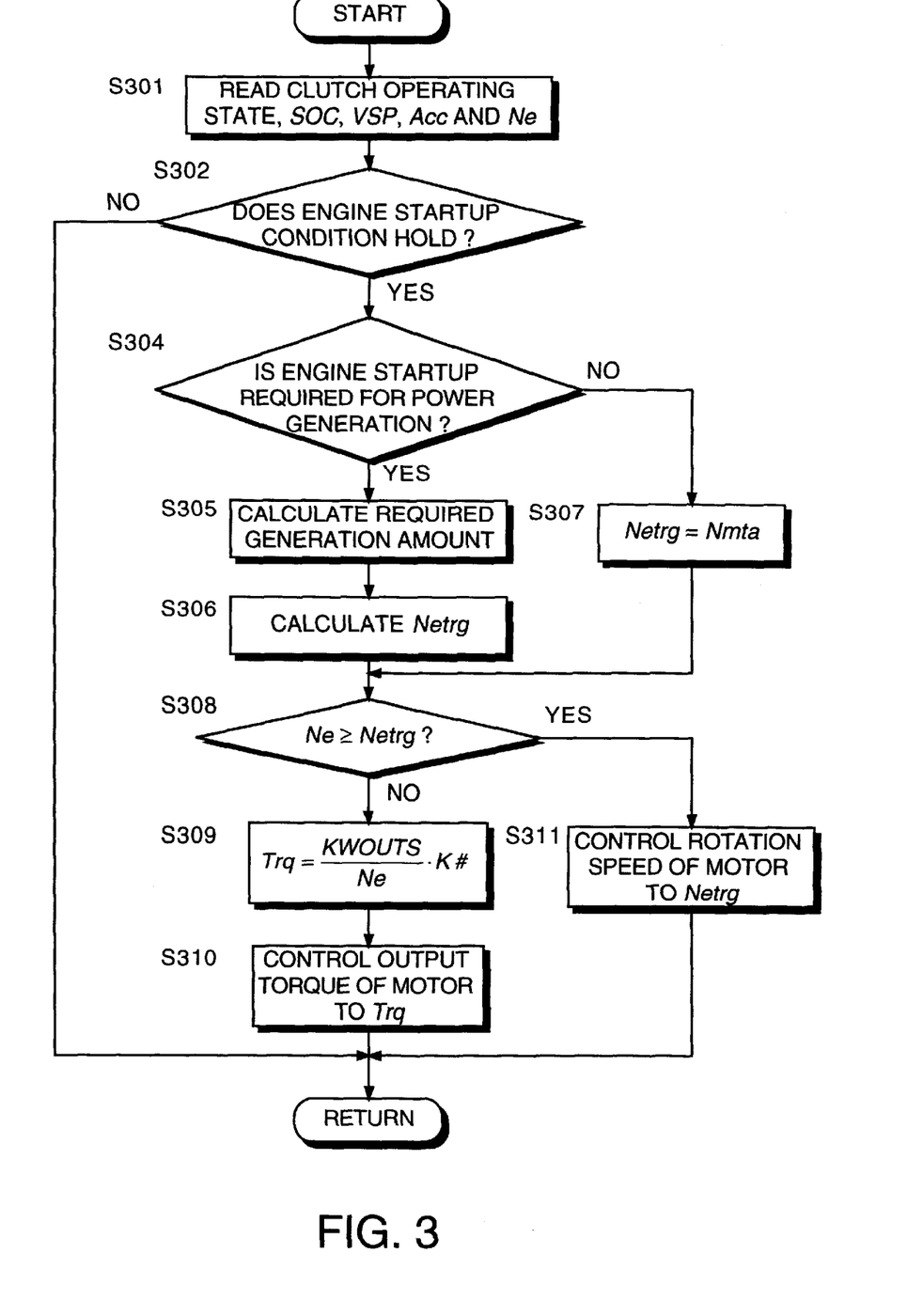
FIG. 3 is a flowchart for describing a motor torque control routine performed by the engine startup controller.
Figure 4B:
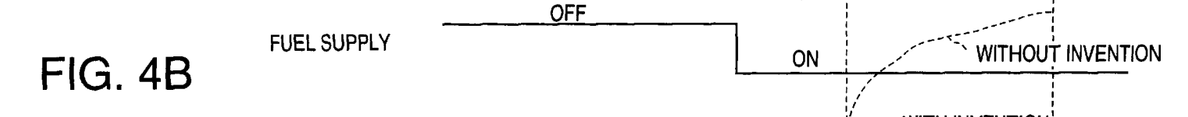

If the fuel supply to the engine 2 is started and the engine 2 begins rotation on its own due to fuel combustion during a torque control period as shown in FIG. 4B, the engine rotation speed Ne will go sharply up. When the engine rotation speed Ne reaches the target rotation speed Netrg, the control of the motor 1 by the controller 16 is changed over from torque control to rotation speed control, and the engine rotation speed Ne is suppressed to the target rotation speed Netrg. Although the battery voltage and SOC fall due to startup of the engine 2 as indicated in FIGS. 4D and 4E, due to this change-over of control, the decrease of SOC is stopped and the voltage of the battery 15 recovers. The engine 2 maintains the target rotation speed Netrg, and is then in a complete combustion state. As the startup conditions of the step S301 no longer hold in complete combustion, the routine of FIG. 3 is henceforth no longer performed until startup of the engine 2 is performed again.

Figure 4C:
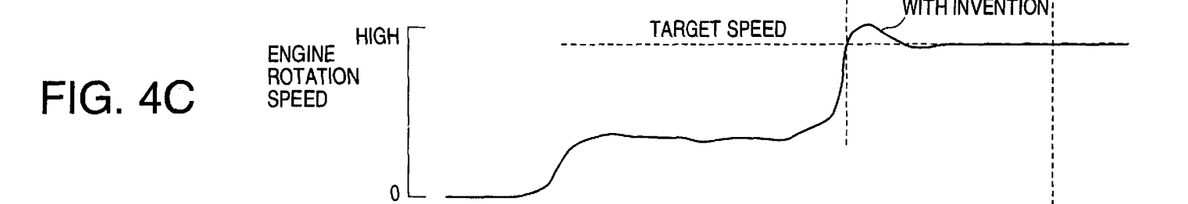
Figure 4D:
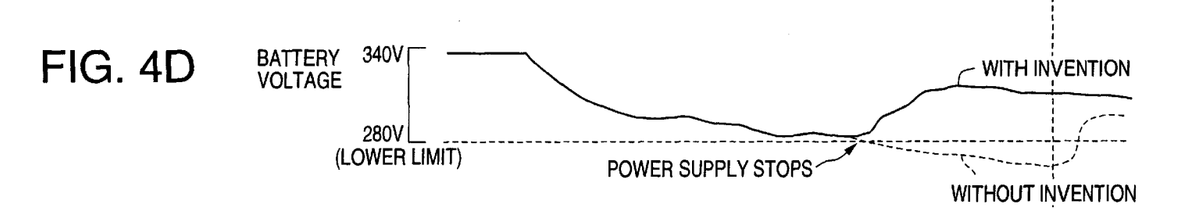
Figure 4E:
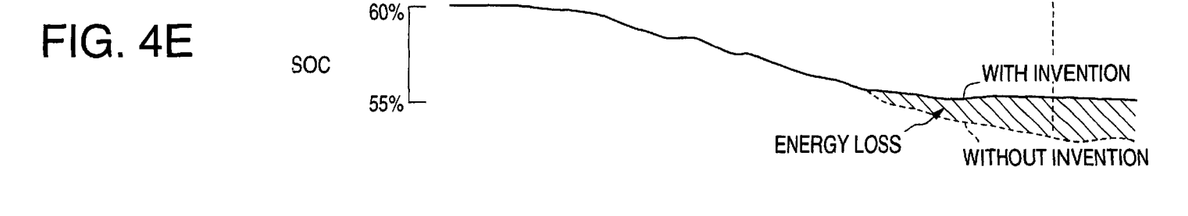

On the other hand, if torque control is continued as it is until complete combustion of the engine 2, the engine rotation speed Ne will greatly exceed the target rotation speed Netrg, as shown by the broken line of FIG. 4C. At the same time, the battery voltage and SOC continue to fall, as shown in FIGS. 4D and 4E.

As the engine 2 is controlled after complete combustion to the target rotation speed Netrg, after the engine speed Ne exceeds the target rotation speed Netrg, the supply of a large amount of power to the motor 1 only consumes the battery power.

According to the routine of FIG. 3, since a change-over from torque control to rotation speed control is performed at the target rotation speed Netrg, a battery energy equivalent to the shaded part of FIG. 4E can be saved. Moreover, as the target rotation speed Netrg of the engine 2 depending on the purpose is attained in the startup control stage, the rotation speed of the engine 2 can be made to quickly reach the optimum rotation speed.

Figure 7:
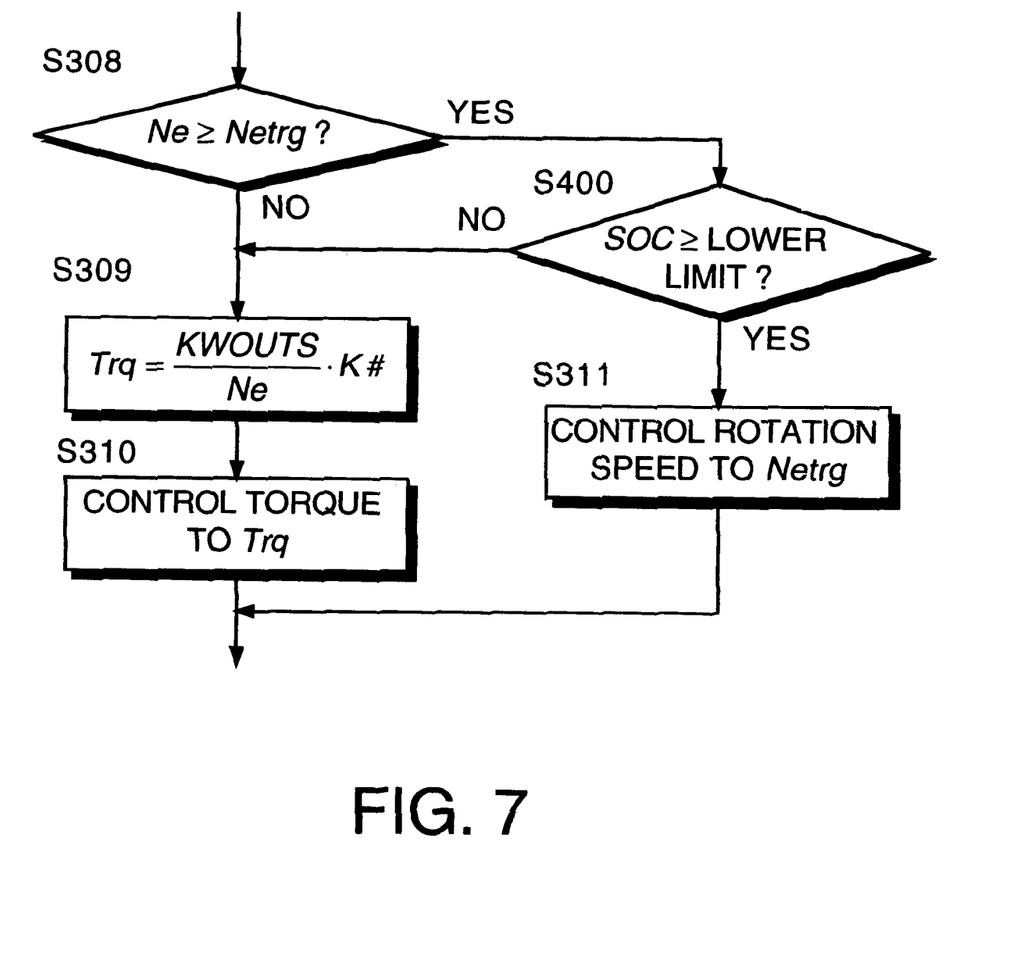
FIG. 7 is a flowchart describing a possible variation of the control routine of FIG. 3.

FIG. 7 shows a variation of the control of FIG. 3.

Here, a step S400 which determines whether the SOC is equal to or greater than a predetermined lower limiting value is provided between the step S308 and the step S3 11. When the SOC is less than the lower limiting value in the step S400, the torque control of the step S309 is performed without performing the rotation speed control of the step S31 1. If the required vehicle drive force exceeds the drive force of the motor 4 in the determining of the step S304 even if the battery charge state SOC is temporarily low, that is, even if the first condition and second condition both hold, the routine proceeds to the step S307, and the target rotation speed Netrg is set equal to the rotation speed Nmta of the first motor 4.

However, if it is attempted to make the rotation speed of the motor 1 coincide with the rotation Nmta of the motor 4, it may occur that more power is consumed than is permitted by the battery charge state SOC, and deterioration of the battery 15 due to over discharge may result. Therefore, even if it has been decided to perform rotation speed control in the step S308, when the battery charge state SOC is less than a lower limiting value in the step S400, the torque control is performed based on the charge state SOC of the battery, and over discharge of the battery 15 is avoided.

The contents of Tokugan Hei 10-293674, with a filing date of Oct. 15, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. An engine startup control device for use with a hybrid vehicle, the vehicle comprising an engine, a first motor for starting the engine, a generator for driving the engine, a drive wheel connected to the engine via a clutch, a second motor for driving the drive wheel and a battery which can be connected to the first motor, the second motor and the generator, the control device comprising:

a sensor which detects a rotation speed of the engine;

a sensor which detects a charge amount of the battery;

a power controller which varies a current supplied to the first motor according to a signal; and a microprocessor programmed to:

calculate a target output torque of the first motor according to the charge amount of the battery;

set the signal so that an output torque of the first motor coincides with a predetermined target output torque when the rotation speed of the engine is less than a predetermined target rotation speed; and set the signal so that the rotation speed of the engine is maintained at the target rotation speed after the rotation speed of the engine has reached the target rotation speed.

2. An engine startup control device as defined in claim 1, wherein the target rotation speed is set equal to the target rotation speed of the engine after a complete combustion of the engine is achieved.

3. An engine startup control device as defined in claim 2, wherein the microprocessor is further programmed to calculate a power that can be supplied by the battery from the charge amount of the battery, and to set the target output torque to be directly proportional to a value obtained by dividing the power by the rotation speed of the engine.

4. An engine startup control device as defined in claim 2, wherein the vehicle further comprises an accelerator pedal, the control device further comprises a sensor which detects a rotation speed of the second motor, a sensor which detects a depression degree of the accelerator pedal and a sensor which detects a vehicle speed, and the microprocessor is further programmed to compare a required vehicle drive force calculated based on the accelerator depression degree and vehicle speed, with a vehicle drive force of the second motor calculated based on the charge amount of the battery and vehicle speed, calculate a required power generation amount of the first motor from the battery charge amount and set the target rotation speed based on the required power generation amount, when the required drive force is less than the vehicle drive force of the second motor.

5. An engine startup control device as defined in claim 2, wherein the vehicle further comprises an accelerator pedal, the control device further comprises a sensor which detects a rotation speed of the second motor, a sensor which detects a depression degree of the accelerator pedal and a sensor which detects a vehicle speed, and the microprocessor is further programmed to compare a required vehicle drive force calculated based on the accelerator depression amount and vehicle speed, with a vehicle drive force of the second motor calculated based on the charge amount of the battery and vehicle speed, and set the target rotation speed equal to the rotation speed of the second motor, when the required drive force exceeds the vehicle drive force of the second motor.

6. An engine startup control device as defined in claim 5, wherein the microprocessor is further programmed to determine whether or not the battery charge amount is less than a predetermined lower limit, and to set the signal so that the output torque of the first motor coincides with a predetermined target output torque even after the rotation speed of the engine reaches the target rotation speed, when the battery charge amount is less than a predetermined lower limit.

7. An engine startup control device for use with an engine started by a motor, comprising:

a sensor which detects a rotation speed of the engine;

a power controller which varies a current supplied to the motor according to a signal; and a microprocessor programmed to:

determine whether or not the rotation speed of the engine has reached a predetermined target rotation speed; and set the signal so that the rotation speed of the engine is maintained at the target rotation speed after the rotation speed of the engine has reached the target rotation speed.

8. An engine startup control device for use with a hybrid vehicle, the vehicle comprising an engine, a first motor for starting the engine, a generator for driving the engine, a drive wheel connected to the engine via a clutch, a second motor for driving the drive wheel and a battery which can be connected to the first motor, the second motor and the generator, the control device comprising:

means for detecting a rotation speed of the engine;

means for detecting a charge amount of the battery;

a power control means for varying a current supplied to the first motor according to a signal;

means for calculating a target output torque of the first motor according to the charge amount of the battery;

means for setting the signal so that an output torque of the first motor coincides with a predetermined target output torque when the rotation speed of the engine is less than a predetermined target rotation speed; and means for setting the signal so that the rotation speed of the engine is maintained at the target rotation speed after the rotation speed has reached the target rotation speed.

9. An engine startup control method for a hybrid vehicle, the vehicle comprising an engine, a first motor for starting the engine, a generator for driving the engine, a drive wheel connected to the engine via a clutch, a second motor for driving the drive wheel, a battery which can be connected to the first motor, the second motor and the generator, and a power controller which varies a current supplied to the first motor according to a signal, the control method comprising:

detecting a rotation speed of the engine;

detecting a charge amount of the battery;

calculating a target output torque of the first motor according to the charge amount of the battery;

setting the signal so that an output torque of the first motor coincides with a predetermined target output torque when the rotation speed of the engine is less than a predetermined target rotation speed; and setting the signal so that the rotation speed of the engine is maintained at the target rotation speed after the rotation speed of the engine has reached the target rotation speed.

* * * * *